(12) United States Patent
Shen et al.

(10) Patent No.: US 11,295,783 B2
(45) Date of Patent: Apr. 5, 2022

(54) METHODS, APPARATUS, AND SYSTEMS FOR AI-ASSISTED OR AUTOMATIC VIDEO PRODUCTION

(71) Applicant: TVU Networks Corporation, Mountain View, CA (US)

(72) Inventors: Paul Shen, Woodside, CA (US); Christopher Bell, Knightdale, NC (US); Matthew Richard McEwen, San Jose, CA (US); Justin Chen, Shanghai (CN)

(73) Assignee: TVU Networks Corporation, Mountain View, CA (US)

( * ) Notice: Subject to any disclaimer, the term of this patent is extended or adjusted under 35 U.S.C. 154(b) by 0 days.

(21) Appl. No.: 16/369,105

(22) Filed: Mar. 29, 2019

(65) Prior Publication Data
US 2019/0311743 A1    Oct. 10, 2019

Related U.S. Application Data

(60) Provisional application No. 62/653,066, filed on Apr. 5, 2018.

(51) Int. Cl.
*G11B 27/036* (2006.01)
*G06F 16/738* (2019.01)
(Continued)

(52) U.S. Cl.
CPC .......... *G11B 27/036* (2013.01); *G06F 16/739* (2019.01); *G06F 16/784* (2019.01); *G06F 40/205* (2020.01); *G06F 40/279* (2020.01); *G06K 9/00744* (2013.01); *G10L 15/26* (2013.01); *G11B 27/11* (2013.01); *G11B 27/34* (2013.01); *H04N 21/2353* (2013.01); *H04N 21/23439* (2013.01); *H04N 21/23892* (2013.01); *H04N 21/2665* (2013.01); *H04N 21/26258* (2013.01); *H04N 21/26603* (2013.01);
(Continued)

(58) Field of Classification Search
USPC .................................. 386/239–248, 278–290
See application file for complete search history.

(56) References Cited

U.S. PATENT DOCUMENTS

2001/0047266 A1* 11/2001 Fasciano .............. G11B 27/034
  704/278
2003/0093790 A1* 5/2003 Logan .................. G10H 1/0033
  725/38
(Continued)

FOREIGN PATENT DOCUMENTS

WO    2013100978    7/2013

*Primary Examiner* — Hung Q Dang
(74) *Attorney, Agent, or Firm* — Lipsitz & McAllister, LLC

(57) ABSTRACT

Methods, apparatus, and systems for automatically producing a video program in accordance with a script are provided. Various media assets are recorded and/or stored in a content database, together with metadata relating to each of the media assets. Each media asset is tagged with a unique content ID, the unique content ID associating the metadata with the media asset. The media assets are then indexed. Text from a script is then analyzed using natural language processing to locate one or more relevant indexed media assets. The located one or more media assets are assembled into a video program in accordance with the script.

34 Claims, 1 Drawing Sheet

(51) Int. Cl.
*G06F 16/783* (2019.01)
*G06F 40/205* (2020.01)
*G06F 40/279* (2020.01)
*G06K 9/00* (2006.01)
*G10L 15/26* (2006.01)
*G11B 27/11* (2006.01)
*G11B 27/34* (2006.01)
*H04N 21/2343* (2011.01)
*H04N 21/235* (2011.01)
*H04N 21/2389* (2011.01)
*H04N 21/262* (2011.01)
*H04N 21/266* (2011.01)
*H04N 21/2665* (2011.01)
*H04N 21/2743* (2011.01)
*H04N 21/278* (2011.01)
*H04N 21/4402* (2011.01)
*H04N 21/8405* (2011.01)
*H04N 21/462* (2011.01)
*H04N 21/8549* (2011.01)
*H04N 21/845* (2011.01)
*H04N 21/84* (2011.01)
*H04N 21/4545* (2011.01)

(52) U.S. Cl.
CPC ....... *H04N 21/278* (2013.01); *H04N 21/2743* (2013.01); *H04N 21/44029* (2013.01); *H04N 21/45457* (2013.01); *H04N 21/4622* (2013.01); *H04N 21/84* (2013.01); *H04N 21/8405* (2013.01); *H04N 21/8455* (2013.01); *H04N 21/8456* (2013.01); *H04N 21/8549* (2013.01)

(56) References Cited

U.S. PATENT DOCUMENTS

| | | | |
|---|---|---|---|
| 2007/0147654 A1* | 6/2007 | Clatworthy | G06F 40/242 382/100 |
| 2007/0237227 A1* | 10/2007 | Yang | H04N 17/004 375/240.12 |
| 2008/0036917 A1 | 2/2008 | Pascarella et al. | |
| 2008/0304808 A1 | 12/2008 | Newell et al. | |
| 2010/0185751 A1* | 7/2010 | Sheedy | H04N 21/8352 709/219 |
| 2011/0249953 A1* | 10/2011 | Suri | H04N 9/8205 386/239 |
| 2012/0128334 A1* | 5/2012 | Cheok | H04N 21/85406 386/278 |
| 2013/0151534 A1* | 6/2013 | Luks | G06F 16/71 707/742 |
| 2013/0216205 A1* | 8/2013 | Suri | G11B 27/034 386/280 |
| 2014/0304597 A1 | 10/2014 | Einstein et al. | |
| 2015/0310894 A1* | 10/2015 | Stieglitz | G11B 27/327 386/241 |
| 2015/0310895 A1* | 10/2015 | Shen | G06F 16/787 386/241 |
| 2016/0098998 A1* | 4/2016 | Wang | G06F 16/433 704/246 |
| 2016/0119655 A1* | 4/2016 | Accardo | H04N 21/8358 725/32 |
| 2017/0110151 A1* | 4/2017 | Matias | G11B 27/3081 |
| 2017/0147576 A1* | 5/2017 | Des Jardins | G06F 16/48 |
| 2017/0169853 A1 | 6/2017 | Hu et al. | |
| 2017/0201562 A1* | 7/2017 | Moon | G06F 16/435 |

* cited by examiner

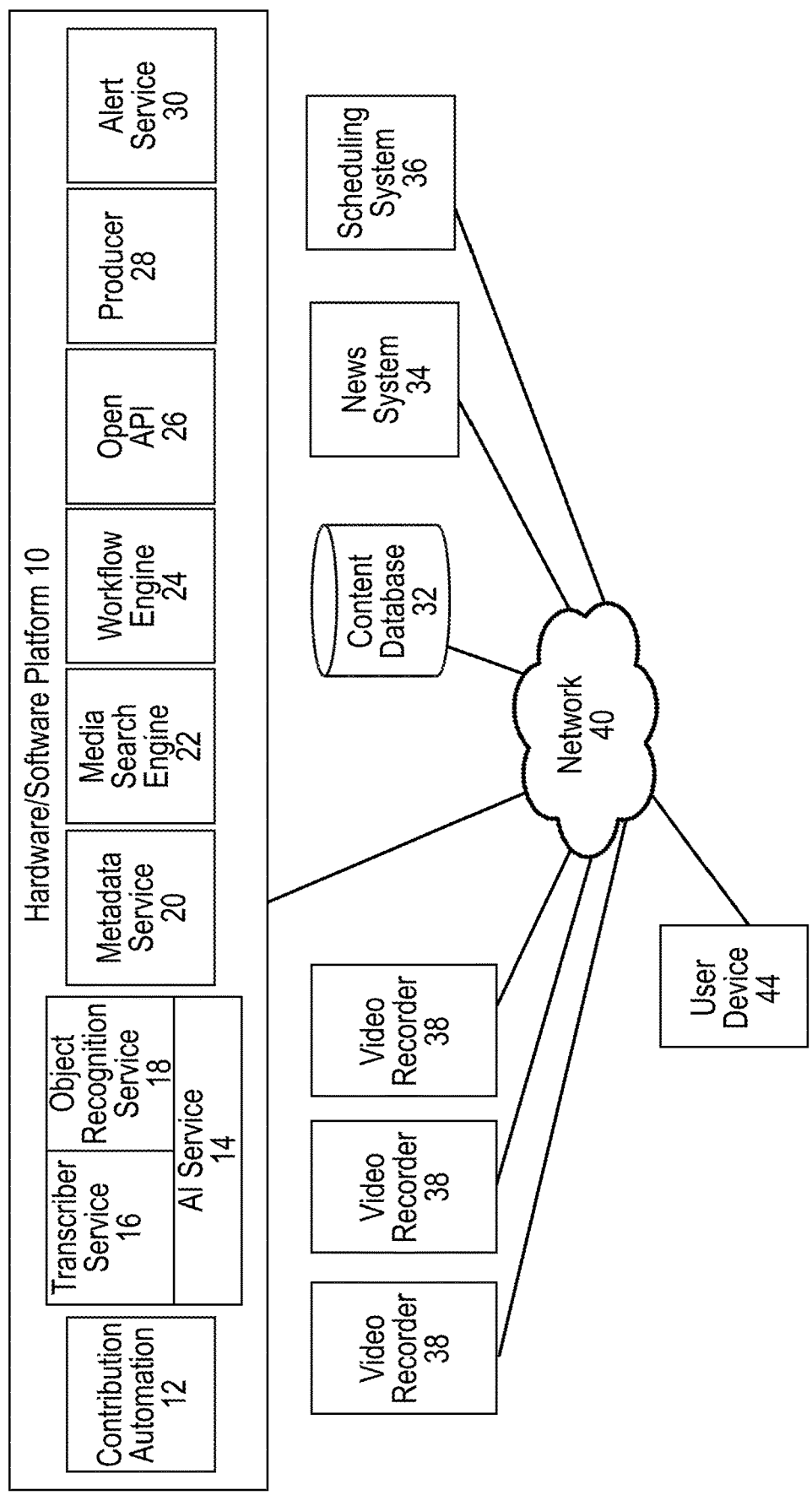

METHODS, APPARATUS, AND SYSTEMS FOR AI-ASSISTED OR AUTOMATIC VIDEO PRODUCTION

This application claims the benefit of U.S. Provisional Application No. 62/653,066 filed on Apr. 5, 2018 (including Appendix), which is incorporated herein in its entirety and made a part hereof by reference for all purposes.

BACKGROUND OF THE INVENTION

The present invention relates to the field of video production. More specifically, the present invention is directed to the automated production of video content, including how media content is tagged, indexed, and combined using various functional modules to create an automated production process. The present invention provides methods, systems, and apparatus for automatically creating video programs in accordance with a written script.

The video production process is a very human driven process. Raw video materials are seen as a passive ingredient in the video production process. Producing the final video program currently requires human involvement in every step of the production process. The production cost is very high, even though the producers are working from a script and know everything about the intended audience.

It would be advantageous to reduce the production costs and to automate some or all of the video production processes, removing at least some of the human involvement.

The methods, apparatus, and systems of the present invention provide the foregoing and other advantages.

SUMMARY OF THE INVENTION

The present invention relates to methods, systems, and apparatus for automatically creating video programs in accordance with a written script.

In accordance with an example embodiment of a method for automatically producing a video program in accordance with a script, various media assets are recorded and/or stored in a content database, together with metadata relating to each of the media assets. Each media asset is tagged with a unique content ID, the unique content ID associating the metadata with the media asset. The media assets are then indexed. Text from a script is then analyzed using natural language processing to locate one or more relevant indexed media assets. The located one or more media assets are assembled into a video program in accordance with the script.

The method may further comprise assigning a time code to each frame of a media asset and associating the time codes with the metadata for the corresponding media asset. The time code may comprise one of a time stamp or a sequence number.

The indexing may comprise analyzing images from the media asset to recognize features comprising at least one of items, actions, and people. Keywords can be determined that are associated with at least some of the features. Speech from the media asset can be converted into text. The features, keywords, and text can be associated with the content ID of the media asset together with the time code identifying a location of the features, keywords, and text within the media asset. The features, keywords, and text can be stored together with the associated content ID and the time code in the content database.

The analyzing of the text from the script to locate one or more relevant media assets may comprise parsing text from the script into script keywords. The content database can then be searched to locate stored metadata, features, keywords, or text relevant to the script keywords using the natural language processing. One or more media assets corresponding to the located metadata, features, keywords, or text can then be obtained based on the content ID and time code of the corresponding metadata, features, keywords, or text.

The method may further comprise utilizing human input in determining features, keywords, and text from the media asset.

The media asset may comprise at least one of a video, a portion of a video, a single frame of a video, multiple frames of a video, and a still image.

The video program may comprise one of a news program, a sports program, a weather program, a live program, a live event, an entertainment program, or the like.

The media asset is obtained from a user's recording device, recording of raw video footage, television production video content, a third-party content provider, local storage on a user computer, cloud storage, or the like.

The metadata may comprise at least one of date and time information of the corresponding media asset recording and geographic position information indicative of a recording location of the recording device during the recording. The metadata may further comprise at least one of recording device location, length of video, video and audio format, time code, size of video file, recording device identification information, ownership and copyright information, additional metadata information predefined or dynamically logged by the user, or the like.

The additional metadata information may comprise at least one of assignment name, geographic location, user name, story title, subject matter reference, program name, source information, type of recording equipment, and user comments. This additional metadata may be entered by text or voice and associated with the media asset.

The tagging of each media asset with the content ID may comprise inserting the content ID into a video stream of the media asset at regular intervals. The tagging of each media asset with the content ID may comprise one of: embedding the content ID in a compressed video stream of the media asset; embedding the content ID in a compressed audio stream of the media asset; embedding the content ID as a Watermark in an uncompressed video stream of the media asset; embedding the content ID as a Watermark in an uncompressed audio stream of the media asset; embedding the content ID as file name for the media asset; and embedding the content ID in a serial digital interface (SDI) signal for the media asset.

At least certain of the media assets may comprise special effects graphics and video clips. Such special effects may be included in the video program in response to special effects key words in the script.

The method may further comprise tailoring the video program to one of a targeted individual or a targeted group in accordance with a target profile.

The present invention also includes apparatus and systems for carrying out the method. An example embodiment of a system for automatically producing a video program in accordance with a script may comprise a content database for storing various media assets, together with metadata relating to each of the media assets, and also a processor and one or more associated software platforms for: tagging each media asset with a unique content ID, the unique content ID associating the metadata with the media asset; indexing the media assets; analyzing text from a script using natural language processing to locate one or more relevant indexed media assets; and assembling the located one or more media assets into a video program in accordance with the script.

The systems and apparatus of the present invention may also include various features of the method embodiments discussed above.

BRIEF DESCRIPTION OF THE DRAWINGS

The present invention will hereinafter be described in conjunction with the appended drawing figure:

FIG. 1 shows a block diagram of a system for automatically producing a video program in accordance with the present invention.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, systems, and apparatus for automatically creating video programs for a script, which can be tailored to a particular audience.

A television station may be thought of as a manufacturer of a video program. The process of producing a video program consists of acquisition of materials (shooting video footage to obtain the raw materials), transmission of the video footage to a production facility, and production (assembling the raw materials together either for a live broadcast or non-live presentation) to create a video program. Then, the video program can be distributed to audiences (such as broadcast over the air, on-demand, streaming or the like). The present invention provides computerized methods, apparatus, and systems to automate most, if not all, of this video production process.

In current video production processes, raw video footage may be shot specifically for a particular script. In most cases, 95% of the raw video footage is not used and/or is discarded. The remainder of the raw video footage is used only for that specific program. With the present invention, the raw video content may be indexed such that it is easily searchable, enabling the video content to be used for any other video programs that it may be relevant to. Further, the video content may be actively pushed or otherwise made available to any program which may be able to reuse it. This process can be applied to recorded content or live content.

In addition, a media company (e.g., television station, news outlet, etc.) quite often consists of multiple different platforms, such as broadcasting, one or more social media outlets, a digital media distribution platform, or the like. Thus, quite often the same story needs to be produced with different scripts that target a particular platform and/or audience. The present invention enables the video footage to be modified automatically in accordance with modifications to the scripts for different platforms and audiences.

In particular, the present invention enables the automatic creation of video programs tailored specifically to a targeted individual (or group) according to a profile of the target individual or group, and a story or a script. The system will automatically turn the written story or script into a video program tailored to a particular audience. For example, in creating a story about the Detroit auto show, the script may be an overview, showing a new model of car. If the video program is tailored to someone interested in a family car, the video program will be modified to show a family car. Similarly, the same video program may be automatically modified for someone interested in a sports car by showing a sports car in the video program. The final video content may be automatically created at the time the content is served to the customer, according to the script and the customer (or group) profile.

Various customer, audience, group, or individual profiles may be stored at a central server location or locally on a user device used to record or create the video program.

The system may be used to create various types of video programs, including news programs, sports, weather, live programs or events, entertainment, and more.

The system may be fully or partially automated. But even without full automation, the present invention will still provide significant improvements and advantages in the video production process. As an example, with the present invention, relevant raw video clips may be delivered automatically to a producer according to his/her story and script. The producer can then make the final decision as to what video content to use and how to use this video content in constructing his/her video program.

FIG. 1 shows an example embodiment of a system for automatic video production in accordance with the present invention. The system comprises hardware/software platform 10, which consists of several functional modules, including but not limited to: Contribution Automation 12, AI service 14 (including Transcriber service 16 and Object Recognition service 18), Metadata service 20, Media Search Engine 22, Workflow Engine 24, Open API 26, Producer 28, and Alert service 30. The system also comprises one or more content databases 32, news systems 34, and scheduling systems 36 in communication with the hardware/software platform 10 via a network 40. In addition, one or more video recorders 38 may provide media assets (e.g., raw video content or portions of video content) to the content database 32 (also referred to herein as "media storage") and to the hardware/software platform 10 via the network 40. The media assets can then be used by the functional modules of the platform 10, as described in detail below.

A user device 44 with a user interface enables user interaction with the hardware/software platform 10. The user interface may comprise one of an application or a web browser running on an Internet-enabled user device. The user device 44 may comprise one of a computer, a laptop computer, a portable computer, a tablet computer, a smart phone, a smart watch, a personal computing device, an Internet-enabled device, or the like.

The video recorders 38 may comprise one or more of a video camera, a camcorder, a television camera, a movie camera, a portable electronic device, a tablet computer, a smart phone, an IP or web camera, or the like.

The network 40 may comprise a wired or wireless network. In addition, those skilled in the art will appreciate that the various functional modules of the platform 10 may be implemented in software, hardware, or a combination of hardware and software, and may be combined into a single device or implemented on separate devices or computer platforms using one or more computer processors.

The media assets may be recorded by one or more video recorders 38 and automatically stored in the content database 32. Those skilled in the art will appreciate that the media asset can be stored on one or more databases 32 or be obtained from other sources (e.g., from a user's recording device, recording of raw video footage, television production video content (e.g., such as news system 34), third party content providers, local storage on a user's computer, cloud storage or other storage device, or the like). The media asset may include audio as well as video content. The automatic acquisition of the media asset may be managed by the Contribution automation module 12, which also enables the content to be pushed to all connected devices.

Metadata relating to each of the media assets can also be recorded and stored in a database. Those skilled in the art will appreciate that the metadata can be stored in the content database 32 together with the media assets, or stored in a separate metadata database. For example, a separate metadata database may be provided as part of the metadata service module 20.

The metadata may comprise date and time information of the recording and geographic position information indicative of a recording location of the recording device 38 during the recording (e.g., GPS data). The metadata information may further comprise at least one of recording device location, length of video, video and audio format, timecode, size of video file, recording device identification information, ownership and copyright information, and additional metadata information predefined or dynamically logged by the user. The additional metadata information (predefined or logged by the user) may comprise at least one of assignment name, geographic location, user name, story title, subject matter reference, program name, source information, type of recording equipment, user comments, or the like. The additional metadata may be entered by text or voice and associated with the media asset via the Contribution Automation module 12. Also, metadata can be created by the AI service 14 for use in recognizing speech and objects within the media asset. Those content specific metadata are associated with the media asset by the unique content ID and time code indicating the location of the speech and object in the media asset. The media asset is searchable by any of the metadata information or a combination of any of the metadata information.

The AI service 14 enables speech to text recognition, such that any speech in the media asset can be converted to text. The text can then be stored in the content database 32 and associated with the media asset using the content ID and the time code. The AI service 14 also provides object recognition capabilities, such that objects, people, actions, or even particular individuals in the media asset are identified. Keywords (e.g., object names, people names, corresponding descriptors, and the like associated with the objects, actions, people or individuals) may be determined and stored in the content database 32 and associated with media asset by unique content ID and time code.

Those skilled in the art will appreciate that the term media asset as used herein includes any type of recorded media or video content, whether with or without audio, as well as any portion of the recorded video content, including single or multiple frames of video content, and still images.

To better associate related metadata with a media asset, each media asset is tagged with a unique content ID by the video recorder 38, or by an intermediate processing unit (such as an encoder or transmitter) if the unique content ID is not already presented in the video stream. The content ID associates the metadata with the media asset. The content ID may be embedded into the video stream. In addition to the content ID, each frame in each video stream is indexed, for example using a unique time code (e.g., a time stamp or a sequence number). Thus, any given frame can be uniquely identified using the content ID and the time code. To ensure the media asset can be identified, the unique ID is injected into the video stream at a regular interval. The unique ID may be embedded with one or more of the following methods:

1. Embedded in a compressed video stream of the media asset;
2. Embedded in a compressed audio stream of the media asset;
3. Embedded as a Watermark in an uncompressed video stream of the media asset;
4. Embedded as a Watermark in an uncompressed audio stream of the media asset;
5. Embedded as file name for the media asset; and/or
6. Embedded in a serial digital interface (SDI) signal for the media asset.

The media asset, once embedded with the unique ID, can be sorted, categorized, and indexed. The system utilizes human input, the artificial intelligence (AI) service 14, or a combination of both human input and the AI service 14 to analyze the metadata associated with the content and also to recognize various features of the content, such as sounds, speech, images, items, objects, actions, and people in the media asset. These features are then associated with the content's unique ID and unique time code. The indexing may be provided for each media asset. A media asset may consist of the entire video content, a portion of the video content, a video content frame, or a number of video content frames. In other words, the system may identify video content having certain sounds, speech, objects, actions, people or the like, or may identify one or more frames of the media asset having such features. Such features may be stored as keywords or additional metadata and associated with the media asset and/or frames of media asset.

All information associated with the media asset is made available in real time for a search. The Search Engine module 22 enables the system to identify video content, or an exact frame or a collection frames from the video content relating to a word, sentence, paragraph, object, action, presence of people, a particular person, or section of text from the script. For example, the script or a portion of the script may be entered into the Search Engine 22 (e.g., via a user device 44 with a user interface). The search engine 22 may parse the script into keywords (referred to herein a "script keywords") and search the media assets in the content database 32 and associated indexed information (such as the metadata, keywords, features, text (converted from speech), and the like stored with the media asset) using natural language processing techniques to locate video content or one or more frames of video content relevant to the script or portions thereof.

Those skilled in the art will appreciate that the database and search engine portions of the platform may be implemented separately or as a single module, in software and/or hardware.

The relevant video content located by the Media Search Engine 22 will be provided to the Workflow engine 24, which allows the system to be adapted to various different workflows and also allows the workflow to be evolved. For example, the Workflow engine 24 will automatically push the relevant materials to the producer module 28 from the content database 32 in accordance with the script. An Alert service 30 provides alerts regarding new stories or content provided to the system. The Open API module 26 allows other functional units, such as new acquisition units (video recorders 38), news systems 34, receivers, routers, encoders, and the like to be integrated into and/or connected with platform 10.

The news systems 34 may comprise news production platforms for producing news programs using the platform 10 or providing news content to the platform 10 or the content database 32, including planning and organizing all relevant materials for a news program, such as the story, script, and raw materials. The scheduling systems 36 may comprise various television or media production scheduling platforms for scheduling production, distribution, or broadcast of programs produced using the platform 10, including resource management such as allocating equipment and camera operators to various locations according to a schedule.

The Producer module 28 will create content automatically according to the script or enable manual creation/editing of content by a user via user device 44. Once selected (either automatically by the system or manually by the user), the video content is then assembled into a video program, which may comprise a video program file or a live video output.

In addition, the addition of special effects graphics or special effects video clips in the production process can be included in the video program in response to special effects keywords in the script. For example, the text "show score" appearing in the script for a sporting event will result in a score overlay being shown on top of video content in the final video program.

Sample Process

The media asset, as it is acquired, is tagged with the unique ID and is stored in content database 32. The system recognizes all the content and index it, after which the content is stored together will all the metadata and identifying information in the database 32. Using the system, the user can create video content as the user writes a script on the user device 44. The script will be parsed into script keywords by the search engine 22. The search engine 22 will automatically identify relevant content from the content database 32 according to the script keywords and select the proper content and/or effects from one or more media assets. The relevant video content is assembled in sequence to compile a video program in accordance with the script. When the user completes the script, the system will output the complete video program (either to a file or as a live video stream).

With Applicant's claimed invention, the script is used by the system similar to the way in which a computer program is used—the system uses the script to produce an output, in this case a video program. Instead of using computer programming language, the present invention uses natural language processing to associate the text from the script (script keywords) with information (metadata, features, and/or keywords) associated with the stored media asset to locate relevant media assets and assemble the corresponding video content into a video program in accordance with the script.

For example, a script for a news story may read "The President said from the White House that U.S. has options open in dealing with North Korea. North Korea has support from China, President Kim just had a face-to-face meeting with Xi in China." With the present invention, this script can be fed into the system, which will analyze the text using natural language processing and locate video content related to the text. The system can then assemble the video in accordance with the script. In this example, the system may locate video content showing the president at the White House and separate video content showing Kim and Xi meeting in China. The system will then create a video program which starts with the video of the president in the White House being shown during the reading of the statement "The President said from the White House that U.S. has options open in dealing with North Korea" and then transition to the video showing Kim and Xi meeting in China during the statement "North Korea has support from China, President Kim just had a face-to-face meeting with Xi in China".

It should be appreciated that the platform can not only be used for automatic video production, but it can help people search for and discover content. With the time code based metadata, user can go directly to a location in the video asset that they are interested from a search. This provides an advantage over other media asset management software, where the physically present user has to visually scan the material to find what they are interested in. Also, with a cloud-based search engine and global metadata database as provided with the present invention, a user can discover content which is outside of their own organization (e.g., third party content or content from other sources). The present invention can be integrated into a video marketplace and/or a video distribution system, enabling the purchase, sale, and distribution of video content.

It should now be appreciated that the present invention provides advantageous methods and apparatus for automatically producing video programs in accordance with a script.

Although the invention has been described in connection with various illustrated embodiments, numerous modifications and adaptations may be made thereto without departing from the spirit and scope of the invention as set forth in the claims.

What is claimed is:

1. A method for automatically producing a video program in accordance with a script, comprising:
   at least one of recording and storing various media assets in a content database, together with metadata relating to each of the media assets;
   tagging each media asset with a unique content ID, the unique content ID associating the metadata with the media asset;
   assigning a time code to each frame of a media asset;
   associating the time codes with the metadata for the corresponding media asset;
   indexing the media assets;
   using natural language processing to analyze text from a script and information from the media assets to locate one or more relevant indexed media assets; and
   assembling the located one or more media assets into a video program in accordance with the script;
   wherein:
   the analyzing of the text from the script to locate one or more relevant media assets comprises:
     parsing text from the script into script keywords;
     searching the content database to locate stored metadata relevant to the script keywords using the natural language processing;
     determining the content ID for each of the located metadata;
     identifying the one or more media asset corresponding to the content IDs for each of the located metadata; and
     obtaining the one or more identified media assets or portions thereof based on the time codes of the corresponding located metadata;
   the various media assets comprise raw video footage or portions of raw video footage obtained from various sources relating to a variety of different video content subject matter recorded at different times and/or at different locations;
   the script comprises a written story;

the various media assets were not originally produced in accordance with the script;

the analyzing of the information from the media assets using the natural language processing comprises at least voice to text processing of the media assets; and the metadata comprises additional metadata information predefined by the user or dynamically logged by the user.

2. The method in accordance with claim 1, wherein the time code comprises one of a time stamp or a sequence number.

3. The method in accordance with claim 1, wherein the indexing comprises:

analyzing images from the media asset to recognize features comprising at least one of items, actions, and people;

determining keywords associated with at least some of the features;

converting speech from the media asset into text;

associating the features, keywords, and text with the content ID of the media asset together with the time code identifying a location of the features, keywords, and text within the media asset; and storing the features, keywords, and text together with the associated content ID and the time code in the content database.

4. The method in accordance with claim 3, further comprising utilizing human input in determining features, keywords, and text from the media asset.

5. The method in accordance with claim 1, wherein the analyzing of the text from the script to locate one or more relevant media assets further comprises:

searching the content database to locate features, keywords, or text relevant to the script keywords using the natural language processing; and obtaining one or more media assets corresponding to the located features, keywords, or text based on the content ID and time code of the corresponding features, keywords, or text.

6. The method in accordance with claim 1, wherein the media asset comprises at least one of a video, a portion of a video, a single frame of a video, multiple frames of a video, and a still image.

7. The method in accordance with claim 1, wherein the video program comprises one of a news program, a sports program, a weather program, a live program, a live event, or an entertainment program.

8. The method in accordance with claim 1, wherein the media asset is obtained from a user's recording device, recording of raw video footage, television production video content, a third-party content provider, local storage on a user computer, and cloud storage.

9. The method in accordance with claim 1, wherein the metadata comprises at least one of date and time information of the corresponding media asset recording and geographic position information indicative of a recording location of the recording device during the recording.

10. The method in accordance with claim 9, wherein the metadata further comprises at least one of recording device location, length of video, video and audio format, time code, size of video file, recording device identification information, and ownership and copyright information.

11. The method in accordance with claim 1, wherein: the additional metadata information comprises at least one of assignment name, geographic location, user name, story title, subject matter reference, program name, source information, type of recording equipment, and user comments; and the additional metadata is entered by text or voice and associated with the media asset.

12. The method in accordance with claim 1, wherein the tagging of each media asset with the content ID comprises inserting the content ID into a video stream of the media asset at regular intervals.

13. The method in accordance with claim 1, wherein the tagging of each media asset with the content ID comprises one of:

embedding the content ID in a compressed video stream of the media asset;

embedding the content ID in a compressed audio stream of the media asset;

embedding the content ID as a Watermark in an uncompressed video stream of the media asset;

embedding the content ID as a Watermark in an uncompressed audio stream of the media asset;

embedding the content ID as file name for the media asset; and embedding the content ID in a serial digital interface (SDI) signal for the media asset.

14. The method in accordance with claim 1, wherein:

at least certain of the media assets comprise special effects graphics and video clips;

including special effects in the video program in response to special effects key words in the script.

15. The method in accordance with claim 1, further comprising tailoring the video program to one of a targeted individual or a targeted group in accordance with a target profile.

16. The method in accordance with claim 1, wherein the script is created without knowledge of the media assets.

17. The method in accordance with claim 1, wherein at least a portion of the media assets comprise third party assets made available to a user via a video marketplace for a fee.

18. A system for automatically producing a video program in accordance with a script, comprising:

a content database for storing various media assets, together with metadata relating to each of the media assets;

a processor and one or more associated software platforms for:

tagging each media asset with a unique content ID, the unique content ID associating the metadata with the media asset;

assigning a time code to each frame of a media asset;

associating the time codes with the metadata for the corresponding media asset;

indexing the media assets;

analyzing text from a script and information from the media assets using natural language processing to locate one or more relevant indexed media assets; and assembling the located one or more media assets into a video program in accordance with the script;

wherein:

the analyzing of the text from the script to locate one or more relevant media assets comprises:

parsing text from the script into script keywords;

searching the content database to locate stored metadata relevant to the script keywords using the natural language processing;

determining the content ID for each of the located metadata;

identifying the one or more media asset corresponding to the content IDs for each of the located metadata; and obtaining the one or more identified media assets or portions thereof based on the time codes of the corresponding located metadata;

the various media assets comprise raw video footage or portions of raw video footage obtained from various sources relating to a variety of different video content subject matter recorded at different times and/or at different locations;

the script comprises a written story;

the various media assets were not originally produced in accordance with the script;

the analyzing of the information from the media assets using the natural language processing comprises at least voice to text processing of the media assets; and the metadata comprises additional metadata information predefined by the user or dynamically logged by the user.

19. The system in accordance with claim 18, wherein the time code comprises one of a time stamp or a sequence number.

20. The system in accordance with claim 18, wherein the indexing comprises:

analyzing images from the media asset to recognize features comprising at least one of items, actions, and people;

determining keywords associated with at least some of the features;

converting speech from the media asset into text;

associating the features, keywords, and text with the content ID of the media asset together with the time code identifying a location of the features, keywords, and text within the media asset; and storing the features, keywords, and text together with the associated content ID and the time code in the content database.

21. The system in accordance with claim 20, further comprising utilizing human input in determining features, keywords, and text from the media asset.

22. The system in accordance with claim 18, wherein the analyzing of the text from the script to locate one or more relevant media assets further comprises:

searching the content database to locate features, keywords, or text relevant to the script keywords using the natural language processing; and obtaining one or more media assets corresponding to the located features, keywords, or text based on the content ID and time code of the corresponding features, keywords, or text.

23. The system in accordance with claim 18, wherein the media asset comprises at least one of a video, a portion of a video, a single frame of a video, multiple frames of a video, and a still image.

24. The system in accordance with claim 18, wherein the video program comprises one of a news program, a sports program, a weather program, a live program, a live event, or an entertainment program.

25. The system in accordance with claim 18, wherein the media asset is obtained from a user's recording device, recording of raw video footage, television production video content, a third-party content provider, local storage on a user computer, and cloud storage.

26. The system in accordance with claim 18, wherein the metadata comprises at least one of date and time information of the corresponding media asset recording and geographic position information indicative of a recording location of the recording device during the recording.

27. The system in accordance with claim 26, wherein the metadata further comprises at least one of recording device location, length of video, video and audio format, time code, size of video file, recording device identification information, and ownership and copyright information.

28. The system in accordance with claim 18, wherein:

the additional metadata information comprises at least one of assignment name, geographic location, user name, story title, subject matter reference, program name, source information, type of recording equipment, and user comments; and the additional metadata is entered by text or voice and associated with the media asset.

29. The system in accordance with claim 18, wherein the tagging of each media asset with the content ID comprises inserting the content ID into a video stream of the media asset at regular intervals.

30. The system in accordance with claim 18, wherein the tagging of each media asset with the content ID comprises one of:

embedding the content ID in a compressed video stream of the media asset;

embedding the content ID in a compressed audio stream of the media asset;

embedding the content ID as a Watermark in an uncompressed video stream of the media asset;

embedding the content ID as a Watermark in an uncompressed audio stream of the media asset;

embedding the content ID as file name for the media asset; and embedding the content ID in a serial digital interface (SDI) signal for the media asset.

31. The system in accordance with claim 18, wherein:

at least certain of the media assets comprise special effects graphics and video clips;

including special effects in the video program in response to special effects key words in the script.

32. The system in accordance with claim 18, wherein the video program is tailored to one of a targeted individual or a targeted group in accordance with a target profile.

33. The system in accordance with claim 18, wherein the script is created without knowledge of the media assets.

34. The system in accordance with claim 18, wherein at least a portion of the media assets comprise third party assets made available to a user via a video marketplace for a fee.

* * * * *